United States Patent

[11] 3,630,073

| [72] | Inventor | Frank Michel<br>Brooklyn, N.Y. |
|------|----------|-------------------------------|
| [21] | Appl. No. | 18,601 |
| [22] | Filed | Mar. 11, 1970 |
| [45] | Patented | Dec. 28, 1971 |
| [73] | Assignee | Pfizer Inc.<br>New York, N.Y. |

[54] TABLET MEASURING AND TESTING DEVICE
10 Claims, 8 Drawing Figs.

| [52] | U.S. Cl. | 73/81, 73/85 |
|------|----------|--------------|
| [51] | Int. Cl. | G01n 3/42 |
| [50] | Field of Search | 73/78, 79, 81, 82, 85, 86, 87, 94 |

[56] References Cited
UNITED STATES PATENTS

| 2,041,869 | 5/1936 | Smith | 73/94 |
| 2,975,630 | 3/1961 | Michel | 73/94 |

FOREIGN PATENTS

| 441,832 | 5/1925 | Germany | 73/81 |

*Primary Examiner*—Richard C. Queisser
*Assistant Examiner*—C. E. Snee, III
*Attorney*—Connolly and Hutz ABSTRACT: Tablets are measured and tested in a V-shaped channel by pushing a plunger against them in response to an external calibrated force. An elongated projection on the head of the projection works in conjunction with a slot in the anvil to snap scored tablets accordingly supported at three points. The thickness of one or a row of tablets is measured by scale markings on the stem of the plunger. Brittleness and shock resistance can also be determined by rapid actuation of the device.

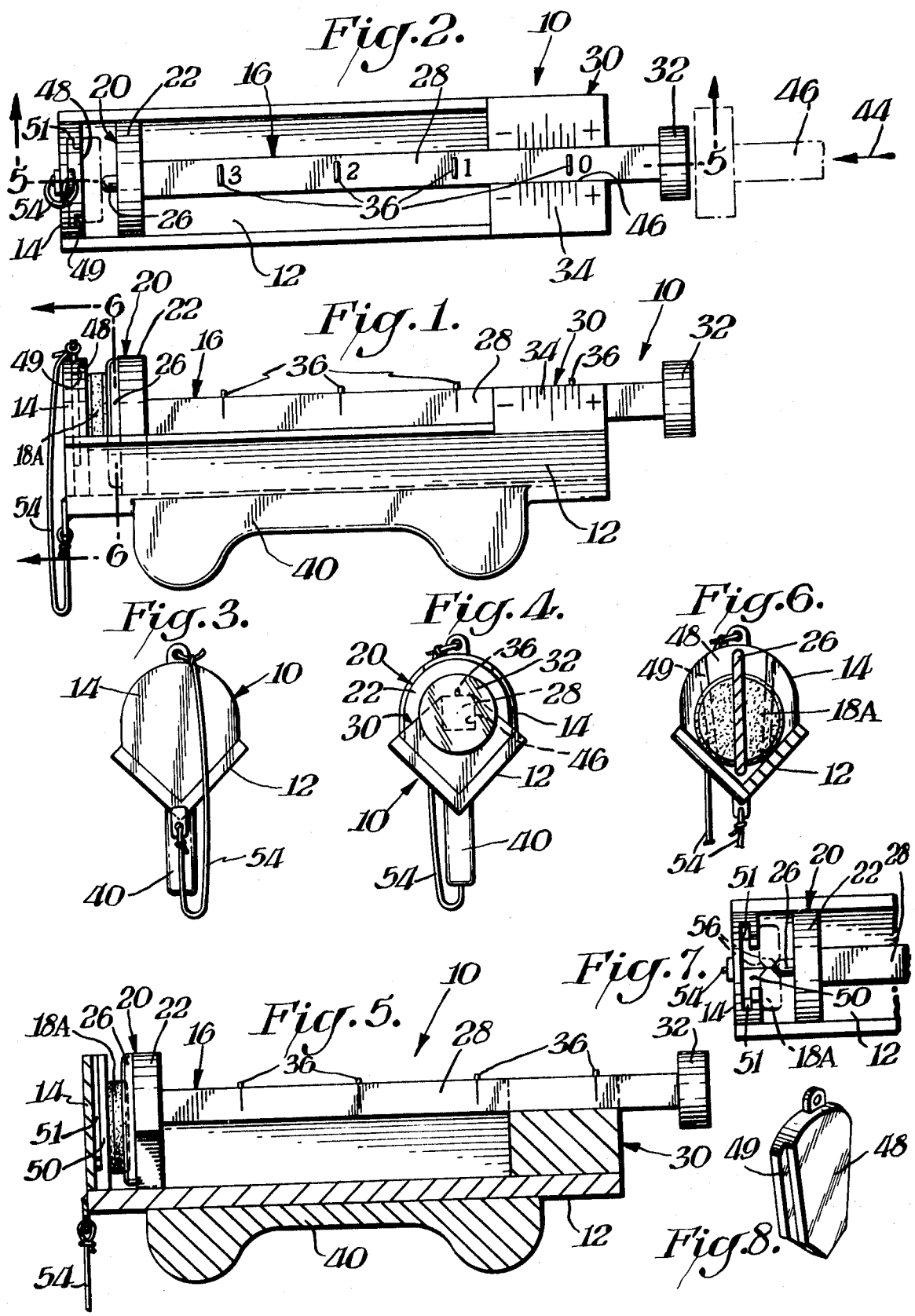

TABLET MEASURING AND TESTING DEVICE

BACKGROUND OF THE INVENTION

This invention relates to a device for performing a variety of measuring and testing functions on tablets for oral consumption such as candy or medicine; and it more particularly relates to such a device for measuring thickness and testing hardness, brittleness and shock resistance. Existing devices for testing the hardness of tablets usually incorporate a calibrated force applicator. A useful form is described in U.S. Pat. No. 2,975,630. There is, however, also a need for a tablet testing device which does not incorporate a calibrated force-applying means and which can perform a variety of other functions such as measuring thickness, brittleness and shock resistance. An object of this invention is to provide a simple and economical device for performing the aforementioned functions.

SUMMARY

A plunger is mounted to slide longitudinally against an anvil within an elongated channel, which receives one or a row of tablets. The linear relationship between the plunger and anvil is indicated by aligned distance scale markings on the plunger stem and bearing support. A projection on the head of the plunger faces the tablet. A tablet is measured and tested by placing it upon the anvil and then pushing a calibrated force against the end of the plunger, which impresses its projection into the tablet. The effective thickness of the tablet before, during and after testing is obtained by reading the distance scale markings. The thickness of a number of tablets, from which average tablet thickness may be computed, is measured by assembling a row in the channel. Strength or resistance to a breaking force is determined by removing an insert from the anvil to expose a slot, or by inserting a slotted stage, and placing a scored tablet in three-point support between the projection on the plunger and the pair of slot edges. Brittleness and shock resistance are determined by rapidly forcing the plunger into the tablet and reading the related force.

BRIEF DESCRIPTION OF THE DRAWING

Novel features and advantages of the present invention will become apparent to one skilled in the art from a reading of the following description in conjunction with the accompanying drawing wherein similar reference characters refer to similar parts and in which:

FIG. 1 is a front view in elevation of one embodiment of this invention;

FIG. 2 is a top plan view of the embodiment shown in FIG. 1;

FIG. 3 is a left-hand view of the embodiment shown in FIGS. 1 and 2;

FIG. 4 is a right-hand end view of the embodiments shown in FIGS. 1 and 2;

FIG. 5 is a cross-sectional view in elevation taken through FIG. 2 along the line 5—5;

FIG. 6 is a cross-sectional view taken through FIG. 1 along the line 6—6;

FIG. 7 is a partial top plan view of a portion of the embodiment shown in FIG. 2 with an insert in the anvil removed to expose a slot; and FIG. 8 is a three-dimensional pictorial view of the removed insert.

DESCRIPTION OF THE PREFERRED EMBODIMENT

In FIGS. 1 and 2 is shown a tablet measuring and testing device 10 including an elongated channel 12 which is for example V-shaped. Anvil 14 is mounted at one end of channel 12 and plunger 16 slides back and forth within channel 12 against tablet 18 resting against anvil 14. Plunger 16 includes a head 20 having a semicircular top section 22 and a V-shaped lower section 24 sliding within V-shaped channel 12. A linearly elongated projection 26 upon head 20 faces anvil 14.

Plunger 16 also includes elongated stem 28, for example of square cross section. Stem 28 slides back and forth within bearing support 30 of corresponding shape. Knob 32 on the rear end of stem 28 provides means for applying an external calibrated force to the plunger as later described. Linear distance scale markings 34 on upper and side surfaces of bearing support 30 (calibrated for example in sixteenths of an inch) and inch markings 36 on stem 28 provide means for measuring the individual and overall thickness of tablets. The 0-inch marking 38 on stem 28 permits the thickness of one or a few tablets to be measured as shown in FIGS. 1 and 2. Handle 40 extends outwardly from the bottom of channel 12 to provide means for firmly grasping it.

The hardness of tablet 18 is determined as shown in FIG. 1 by pushing actuator 42 of an external calibrated force instrument 46 (not fully illustrated) against knob 32 of device 10 in the direction of arrow 44. The hardness is a function of the force required to impress projection 26 into tablet 18 and also the depth of penetration into the tablet. This depth is readily obtained by reading the relative positions of scale markings 34 and 36 before and after penetration into tablet 18.

The V-shaped cross section of channel 12 is shown in FIGS. 3 and 4. The corresponding square cross sections of stem 28 and bearing support 30 are shown in FIG. 4.

In FIGS. 5-8 tapered insert 48 having dovetailed edges 49 is removed from tapered slot 50 having corresponding dovetailed edges 51 in anvil 14 to expose a pair of spaced edges 52 against which scored tablet 18A is forced in three-point snapping action by projection 26. The scoring 56 is aligned with linear projection 26. This means for determining the force necessary to snap scored tablet 18A is indicative of the tablet's strength and simulates the force applied when bisecting a scored tablet using only the fingers. The taper of slot 50 provides suitable spaced support for tablets of varying size. Lanyard 54 chains insert 48 to channel 12 to prevent it from being lost when removed. In an alternate embodiment, not shown, a separate slotted stage is inserted in channel 12 between anvil 14 and the tablet 18A. A slot width equal to approximately three-fourths the tablet diameter is preferred.

The calibrated force instrument is, for example, any standard push-type instrument of the bench variety. It is, for example, of the Chatillon type. Chatillon is a registered trademark of John & Sons, Div. of Aero Chatillon Corp., 83–28 Kew Gardens Road, Kew Gardens, N.Y. 11415.

Device 10 can be used to determine the brittleness or shock resistance of a tablet by rapidly forcing plunger 16 against it and reading the force necessary to break the tablet under impact.

This device therefore has the following unique combination of functions and features:

1. Determining hardness of tablets in excess of the standard instrument scale of 15 to 16 kg. The range of this device is unlimited because any available calibrated force instrument may be used in conjunction with it; additionally, edgewise tablet compression as employed in prior devices ordinarily requires more force to break a tablet than is required when breaking it in shear as in the device of the present invention. Accordingly, the range of the new instrument includes harder and larger tablets than can be handled by the prior devices;

2. Measurement of tablet thickness before, during and after testing;

3. Measurement of the average thickness of a row of tablets;

4. Determination of brittleness or shock resistance;

5. Determination of strength and snapping characteristics of tablets by the snapping of tablets in three-point action, and 6. Economy by virtue of inexpensive structure and absence of a coupled calibrated force instrument.

I claim:

1. A tablet measuring and testing device comprising an elongated channel for receiving one or more of said tablets, an anvil disposed at one end of said channel for supporting a tablet, a plunger including a head and an elongated stem, a bearing support at the end of said channel remote from said anvil, said stem being mounted to slide back and forth in said bearing support, said stem having a rear end remote from said head for a applying force to said plunger, and a projection upon said head facing said anvil for applying a concentrated force to a tablet upon said anvil.

2. A device as set forth in claim 1, wherein said elongated stem has a longitudinal axis and said projection is linearly elongated transverse to said longitudinal axis of said elongated stem.

3. A device as set forth in claim 2, wherein an insert is disposed in a slot in the tablet-supporting surface of said anvil, facing said head said slot having a pair of spaced edges in said tablet-supporting surface of said anvil which are exposed by removal of said insert, and said linearly elongated projection being substantially aligned with the longitudinal axis of said slot whereby the force required to snap a tablet between said pair of edges and said projection may be determined.

4. A device as set forth in claim 3, wherein said insert and slot are tapered inwardly toward the base of said channel.

5. A device as set forth in claim 1, wherein said elongated channel is V-shaped.

6. A device as set forth in claim 1, wherein a knob is disposed on the rear end of said stem.

7. A device as set forth in claim 1, wherein said channel is V-shaped and said projection is linearly elongated and disposed to bisect the angle within said V-shaped channel.

8. A device as set forth in claim 7, wherein said stem and said bearing support have corresponding rectangular cross sections.

9. A device as set forth in claim 1, wherein linear distance scale markings are applied upon said stem and upon said bearing support to permit the thickness of a tablet disposed between said head and said anvil to be measured.

10. A device as set forth in claim 8, wherein a handle is disposed on the base of said channel to permit said device to be firmly grasped.

* * * * *